United States Patent
Tsuji et al.

(10) Patent No.: US 6,309,779 B1
(45) Date of Patent: Oct. 30, 2001

(54) HYDROGEN STORAGE ALLOY ELECTRODE AND METHOD FOR MANUFACTURING THE SAME

(75) Inventors: Yoichiro Tsuji, Katano; Osamu Yamamoto, Hirakata; Yoshinori Toyoguchi, Yao; Hiromu Matsuda, Kawabe-gun, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/502,537

(22) Filed: Feb. 11, 2000

(30) Foreign Application Priority Data

Feb. 17, 1999 (JP) .................................................. 11-038376

(51) Int. Cl.⁷ ..................................................... H01M 4/38
(52) U.S. Cl. ........................................ 429/218.2; 420/900
(58) Field of Search ........................ 420/900; 429/218.1, 429/218.2, 59, 57

(56) References Cited

U.S. PATENT DOCUMENTS 5,532,076 * 7/1996 Yamamura et al. ................... 429/59
6,048,644 * 4/2000 Tsuji et al. ......................... 429/218.2

FOREIGN PATENT DOCUMENTS

| 06228699 A | 8/1994 | (JP) . |
| 07268513 A | 10/1995 | (JP) . |
| 07268514 A | 10/1995 | (JP) . |

* cited by examiner

Primary Examiner—Gabrielle Brouillette
Assistant Examiner—M. Wills
(74) Attorney, Agent, or Firm—Akin, Gump, Strauss, Hauer & Feld, L.L.P.

(57) ABSTRACT

A hydrogen storage alloy electrode having a high capacity and excellent cycle characteristics is provided. The electrode is made from particulate active material comprising a hydrogen storage alloy of body-centered cubic crystal structure or body-centered tetragonal crystal structure, said hydrogen storage alloy being represented by the general formula $Ti_a M^1_b Cr_c M^2_d L_e$, wherein $M^1$ is at least one element selected from the group consisting of Nb and Mo; $M^2$ is at least one element selected from the group consisting of Mn, Fe, Co, Cu, V, Zn, Zr, Ag, Hf, Ta, W, Al, Si, C, N, P and B; L is at least one element selected from the group consisting of rare-earth elements and Y; $0.2 \leq a \leq 0.7$; $0.01 \leq b \leq 0.4$; $0.1 \leq c \leq 0.7$; $0 \leq d \leq 0.3$; $0 \leq e \leq 0.03$; and $a+b+c+d+e=1.0$, and said particulate active material having a Ti—Ni system alloy phase in the surface portion thereof.

14 Claims, No Drawings

HYDROGEN STORAGE ALLOY ELECTRODE AND METHOD FOR MANUFACTURING THE SAME

BACKGROUND OF THE INVENTION

The present invention relates to a hydrogen storage alloy electrode which employs, as an active material, a hydrogen storage alloy capable of electrochemically absorbing and desorbing hydrogen in a reversible manner.

Electrodes employing as an active material a hydrogen storage alloy capable of absorbing and desorbing hydrogen in a reversible manner have a larger theoretical energy density compared to cadmium electrodes. Also, electrodes that employ such hydrogen storage alloy are not susceptible to deformation and subsequent formation of dendrites, which is a problem with zinc electrodes. These advantageous properties, as well as the promise of a longer service life and a reduction in the environmental concerns inherent in cadmium-containing electrode/batteries, have encouraged research into developing alloys suited for hydrogen storage alloy electrodes, and particularly negative electrodes for alkaline storage batteries.

Conventional alloys for hydrogen storage alloy electrodes are typically prepared through either an arc melting process, an induction heating melting process, or some similar process. The hydrogen storage alloys currently used for electrodes are La (or Mm)—Ni system multi-element alloys (wherein Mm (misch metal) is a mixture of rare-earth elements). These multi-element alloys are classified as an $AB_5$ type (wherein A is La, Zr, Ti or an element with a affinity for hydrogen, and B is Ni, Mn, Cr or any other transition metal with a small affinity for hydrogen).

Another alloy having larger hydrogen storing capability than the $AB_5$ type is a Ti—V system hydrogen storage alloy. For example, hydrogen storage alloy electrodes employing a $Ti_xV_yNi_z$ alloy are known in conventional. See, e.g., Japanese Laid-Open Patent Publication Nos. 6-228699, 7-268513, and 7-268514.

The La (or Mm)—Ni system multi-element alloy, however, nearly uses the whole theoretical capacity, so there is little probability of drastic capacity increase.

On the other hand, electrodes made from the Ti—V system hydrogen storage alloy have a larger discharge capacity than electrodes made from the La (or Mm)—Ni system alloy; however, there is a problem that the discharge capacity is still lower than the theoretical discharge capacity. Also, the electrodes have to achieve improved cycle characteristic and cost reduction.

BRIEF SUMMARY OF THE INVENTION

The present invention relates to a hydrogen storage alloy electrode made from particulate active material comprising a hydrogen storage alloy of body-centered cubic or body-centered tetragonal crystal structure, said hydrogen storage alloy being represented by the general formula $Ti_aM^1{}_bCr_cM^2{}_dL_e$, wherein $M^1$ is at least one element selected from the group consisting of Nb and Mo; $M^2$ is at least one element selected from the group consisting of Mn, Fe, Co, Cu, V, Zn, Zr, Ag, Hf, Ta, W, Al, Si, C, N, P and B; L is at least one element selected from the group consisting of rare-earth elements and Y; $0.2 \leq a \leq 0.7$; $0.01 \leq b \leq 0.4$; $0.1 \leq c \leq 0.7$; $0 \leq d \leq 0.3$; $0 \leq e \leq 0.03$; and $a+b+c+d+e=1.0$, and said particulate active material having a Ti—Ni system alloy phase in the surface portion thereof.

Of the hydrogen storage alloys, the general formula of preferred ones satisfy $0.4 \leq a \leq 0.64$, $0.05 \leq b \leq 0.2$, $0.3 \leq c \leq 0.4$, $0 \leq d \leq 0.2$, $0 \leq e \leq 0.03$ and $a+b+c+d+e=1.0$. More preferred ones are represented by the general formula $Ti_aM^1{}_bCr_cM^2{}_dL_eFe_fSi_g$ wherein $M^1$ is neither Fe nor Si, $0.003 \leq f < 0.2$, $0 < g \leq 0.1$, $d+f+g \leq 0.2$ and $a+b+c+d+e+f+g=1.0$.

It is preferred that 70% by volume or more of the Ti—Ni system alloy phase has the body-centered cubic crystal structure of TiNi. It is also preferred that nickel concentration of the particulate active material gradually decreases from the surface towards inside thereof. The particulate active material preferably has a particle size of 40 μm or below.

The present invention also relates to a method for manufacturing a hydrogen storage alloy electrode comprising the steps of: (A) plating nickel or applying nickel powder onto the surface of a hydrogen storage alloy powder, or mixing a hydrogen storage alloy powder with a nickel carbonyl-containing gas and thermally decomposing the gas to apply nickel onto the surface of the alloy powder, and (B) heating the alloy powder at 500 to 1000° C. in an atmosphere of an inert gas or a hydrogen gas, or under vacuum, said hydrogen storage alloy of starting material having body-centered cubic crystal structure or body-centered tetragonal crystal structure, and being represented by the general formula $Ti_aM^1{}_bCr_cM^2{}_dL_e$, wherein $M^1$ is at least one element selected from the group consisting of Nb and Mo; $M^2$ is at least one element selected from the group consisting of Mn, Fe, Co, Cu, V, Zn, Zr, Ag, Hf, Ta, W, Al, Si, C, N, P and B; L is at least one element selected from the group consisting of rare-earth elements and Y; $0.2 \leq a \leq 0.7$; $0.01 \leq b \leq 0.4$; $0.1 \leq c \leq 0.7$; $0 \leq d \leq 0.3$; $0 \leq e \leq 0.03$; and $a+b+c+d+e=1.0$.

It is preferred that the nickel carbonyl-containing gas contains 20 to 90% by volume of nickel carbonyl and 10 to 80% by volume of carbon monoxide. Alternatively, the nickel carbonyl-containing gas preferably contains 20 to 85% by volume of nickel carbonyl, 10 to 75% by volume of carbon monoxide, and 5 to 50% by volume of at least one selected from the group consisting of iron carbonyl, chromium carbonyl, molybdenum carbonyl, and tungsten carbonyl.

It is also preferred that, prior to step (A), the step of: (X) mixing the hydrogen storage alloy powder with a gas containing 20 to 90% by volume of at least one selected from the group consisting of iron carbonyl, chromium carbonyl, molybdenum carbonyl and tungsten carbonyl, and 10 to 80% by volume of carbon monoxide, and then thermally decomposing the gas to apply at least one selected from the group consisting of iron, chromium, molybdenum and tungsten onto the surface of the alloy powder.

It is preferable that, prior to step (A) or (X), the hydrogen storage alloy powder is heated at 1200 to 1400° C. in an atmosphere of an inert gas or a hydrogen gas, or under vacuum.

The present invention further relates to a method for manufacturing a hydrogen storage alloy electrode comprising the step of conducting mechanochemical reaction between hydrogen storage alloy powder and nickel, said hydrogen storage alloy having body-centered cubic crystal structure or body-centered tetragonal crystal structure, and being represented by the general formula $Ti_aM^1{}_bCr_cM^2{}_dL_e$, wherein $M^1$ is at least one element selected from the group consisting of Nb and Mo: $M^2$ is at least one element selected from the group consisting of Mn, Fe, Co, Cu, V, Zn, Zr, Ag, Hf, Ta, W, Al, Si, C, N, P and B; L is at least one element selected from the group consisting of rare-earth elements and Y; $0.2 \leq a \leq 0.7$; $0.01 \leq b \leq 0.4$; $0.1 \leq c \leq 0.7$; $0 \leq d \leq 0.3$; $0 \leq e \leq 0.03$; and $a+b+c+d+e=1.0$.

It is preferable that, prior to the step of the mechanochemical reaction, the hydrogen storage alloy powder is heated at 1200 to 1400° C. in an atmosphere of an inert gas or a hydrogen gas, or under vacuum.

DETAILED DESCRIPTION OF THE INVENTION

The particulate active material in the present invention is an improved one of conventional hydrogen storage alloy powder having body-centered cubic crystal structure. In other words, the particulate active material is one obtained by forming Ti—Ni system alloy phase in the surface portion of the hydrogen storage alloy particles having either body-centered cubic or body-centered tetragonal crystal structure and not containing nickel. The use of particulate material with such a structure can increase both hydrogen storing capability and discharge capacity, and improve the corrosion resistance of the alloy so as to provide a long-lived electrode.

(1) The following is a description of the composition of the hydrogen storage alloy before the formation of the Ti—Ni system alloy phase in the surface portion.

The above-mentioned alloy is represented by the general formula $Ti_aM^1{}_bCr_cM^2{}_dL_e$ wherein $M^1$ is at least one element selected from the group consisting of Nb and Mo; M2 is at least one element selected from the group consisting of Mn, Fe, Co, Cu, V, Zn, Zr, Ag, Hf, Ta, W, Al, Si, C, N, P and B; and L is at least one element selected from the group consisting of rare-earth elements and Y; $0.2 \leq a \leq 0.7$; $0.01 \leq b \leq 0.4$; $0.1 \leq c \leq 0.7$; $0 \leq d \leq 0.3$; $0 \leq e \leq 0.03$; and $a+b+c+d+e=1.0$.

The alloy does not contain nickel to prevent nickel from dissolving throughout the alloy particle and to avoid the formation of a segregated phase containing nickel with smaller hydrogen storing capability, which would decrease hydrogen-storing capability of the active material. In addition, trace amounts of nickel are likely to dissolve in the main phase, too, which would undesirably increase plateau pressure (hydrogen equilibrium pressure) to reduce the hydrogen storing capability. Thus the exclusion of nickel from the basic composition can increase the hydrogen storing capability. On the other hand, the Ti—Ni system alloy phase, which is formed by diffusing Ni into the surface portion in the following method, does not form such segregated phase and probably gives only improved corrosion resistance of the surface layer and improved characteristic of the electrode to be obtained.

Titanium is added to the alloy because the large atomic radius thereof increases the lattice size of the alloy to lower the plateau pressure, thereby increasing the hydrogen storing capability. Furthermore, the presence of titanium accelerates the formation of the Ti—Ni system alloy phase at lower temperatures by diffusing nickel from the alloy particle surface into the inside. The increase in the hydrogen storing capability is remarkable when the titanium content of the alloy, namely "a" in the general formula is 0.2 or larger. When "a" is larger than 0.7, on the other hand, hydrogen becomes stable in the alloy and harder to be released, which decreases the storing capability. In order to maintain the plateau pressure between 0.01 and 0.1 MPa which is believed best for use in batteries, the preferable range is $0.4 \leq a \leq 0.64$. While plateau pressure lower than 0.01 MPa tends to deteriorate the discharge characteristics of batteries, the plateau pressure higher than 0.1 MPa is likely to decrease rapid charge characteristics.

$M^1$, which can be molybdenum or niobium, contributes to an increase in lattice size of the alloy due to the large atomic radius like titanium. These alloys also improve the cycle life of electrodes, which is considered because passivation of titanium is suppressed. Both elements have approximately the same effects. In order to obtain the effects of the present invention, "b" in the general formula should be $0.01 \leq b \leq 0.4$; however, it is preferably $0.05 \leq b \leq 0.2$ to keep the plateau pressure within the best range for use in batteries.

Chromium is added to the alloy to facilitate its activation, and to provide the corrosion resistance in an alkaline electrolyte. In order to secure these effects, the chromium content or "c" in the general formula must be 0.1 or larger. However, chromium undesirably increases the plateau pressure of the alloy so as to decrease the hydrogen storing capability. To avoid this, "c" must be 0.7 or lower. The plateau pressure can be kept within its optimum range for use in batteries when $0.3 \leq c \leq 0.4$.

A rare-earth element like lanthanum, cerium, or yttrium is added in trace amounts to the alloy in order to further increase the hydrogen storing capability. The increase is considered to result from these elements functioning as deoxidant to eliminate impurity of oxygen contained in the alloy. These elements are preferably segregated as a second phase and are not contained in the matrix. Therefore, the hydrogen storing capability can be exclusively increased while hardly affecting the composition of the matrix nor changing the plateau pressure. The effect remains the same even when the L content is larger than 3 atom % in the alloy. Therefore, in the general formula, $0 \leq e \leq 0.03$.

Besides the above-mentioned elements, the alloy can contain Mn, Fe, Co, Cu, V, Zn, Zr, Ag, Hf, Ta, W, Al, Si, C, N, P or B, if necessary. Adding at least one of these elements allows the lattice size of the alloy to be varied according to their atomic radius, which controls the plateau pressure to increase the hydrogen storing capability. Above all, Mn, V, Ta and Al increase the hydrogen storing capability, whereas Fe, Co, Cu, Zn, Zr, Ag, Hf, W, Si, N, P and B enhance the electrode activity to improve discharge capacity and cycle life. The $M^2$ content or "d" in the general formula must be 0.3 or lower. When "d" is higher than 3, a phase having a crystal structure other than the body-centered cubic would segregate, decreasing the hydrogen storing capability. It is also preferred that $0 \leq d \leq 0.2$.

When both iron (Fe) and silicon are contained as element $M^2$, that is, when the alloy is represented by the general formula $Ti_aM^1{}_bCr_cM^2{}_dL_eFe_fSi_g$ wherein $M^1$ is neither iron nor silicon, a battery having excellent storage properties under high temperatures is obtained. This is considered to result from either the alloy being prevented from pulverizing or an oxide film of iron and silicone being formed on the alloy surface to prevent the alloy from being dissolved during the storage under high temperatures.

To greatly improve the storage properties of a battery under high temperatures, it is preferred that $0.003 \leq f < 0.2$, $0 < g \leq 0.1$, $d+f+g \leq 0.2$ and $a+b+c+d+e+f+g=1.0$.

(2) The following will be a description of the formation of the Ti—Ni system alloy phase.

In the present invention, from a viewpoint of providing the alloy with excellent hydrogen storage ability and electrochemical catalysis for the reaction accompanied with absorbing and disrobing hydrogen, the Ti—Ni system alloy phase is formed in the surface portion of the alloy particles. The process is diffusing nickel atoms from the surface to the inside of the alloy particle to form the Ti—Ni system alloy phase in the surface portion or area. A mere application of nickel on the surface of the alloy particles would decrease the capacity, reducing hydrogen diffusion rate.

The Ti—Ni system alloy phase can comprise $Ti_2Ni$, $TiNi$, $TiNi_3$ and the like. The Ti—Ni system alloy phase further contains alloy component such as Cr, Mo, other than Ti, which result to an excellent electrode having an appropriate balance between catalysis, corrosion resistance and hydrogen storing capability. Above all, an alloy phase having the same body-centered cubic crystal structure as TiNi has the most preferable balance between electrode activity, corrosion resistance and hydrogen storage properties. Consequently, it is preferred that 70% or more of the Ti—Ni system alloy phase has the same body-centered cubic crystal structure as TiNi. The content of the phase having the same body-centered cubic crystal structure as TiNi can be found by X-ray diffraction, for example.

The nickel amount to be added is preferably 5 to 15wt % to the hydrogen storage alloy to secure the appropriate balance between electrode activity, corrosion resistance and hydrogen storing capability. A gradual decrease of nickel concentration from the alloy particle surface towards the inside allows the surface layer and the inside to be preferable, becoming an active material highly resistant to charging and discharging cycles. Of the entire amount of nickel, 90% or more exists preferably in a depth up to 0.5 to 3 $\mu$m from the alloy particle surface, and more preferably in a depth up to 1 to 2 $\mu$m from the alloy particle surface. Available to obtain the structure is the following method comprising: (A) a process of plating nickel or applying nickel powder onto the surface of a hydrogen storage alloy powder (plating process and powder process, respectively), or a process of mixing a hydrogen storage alloy powder with a nickel carbonyl-containing gas and then thermally decomposing the gas to apply nickel onto the surface of the alloy powder (vapor-phase process) and (B) then, a process of heating the alloy powder in an atmosphere of an inert gas or a hydrogen gas, or under vacuum. In the vapor-phase process, the thermal decomposition of the gas can be conducted at around 300° C., for example.

The process of mechanochemical reaction between hydrogen storage alloy powder and nickel is also available, wherein nickel can be physically diffused, such as mechanical alloying process using a planetary ball mill or the like.

The heating temperatures in the heating process (B) are preferably 500 to 1000° C., and more preferably 550 to 700° C. Temperatures lower than 500° C. do not diffuse nickel sufficiently. Temperatures above 1000° C., on the other hand, diffuse nickel too far inside, which not only decreases hydrogen storing capability but also increases the amount of $Ti_2Ni$ in the surface layer to deteriorate electrode characteristics. The heating time is about 3 to 48 hours, depending on the heating temperatures. When the plating process is employed to apply nickel, the preferable heating time is 3 to 24 hours at 600 to 700° C.

When the vapor-phase process is employed to apply nickel, the nickel carbonyl-containing gas preferably contains 20 to 90% by volume of nickel carbonyl and 10 to 80% by volume of carbon monoxide.

Prior to the process (A), another process (X) may be performed as follows: the hydrogen storage alloy powder is mixed with a source gas containing 20 to 90% by volume of at least one selected from the group consisting of iron carbonyl, chromium carbonyl, molybdenum carbonyl and tungsten carbonyl and 10 to 80% by volume of carbon monoxide. The gas is thermal-decomposed to apply the alloy powder surface with at least one selected from the group consisting of iron, chromium, molybdenum and tungsten. Thus the application or adhesion of these metals and nickel thereon increases nickel concentration in the particle surface, further improving the electrode characteristics. The content of at least one selected from the group consisting of iron, chromium, molybdenum and tungsten is preferably 5 to 50% by mole of the sum of these elements and nickel.

Alternatively, it is possible to employ a gas containing 20 to 85% by volume of nickel carbonyl, 10 to 75% by volume of carbon monoxide and 5 to 50% by volume of at least one selected from the group consisting of iron carbonyl, chromium carbonyl, molybdenum carbonyl and tungsten carbonyl. In this case, at least one selected from the group consisting of iron, chromium, molybdenum and tungsten is applied onto the surface of the alloy particles together with nickel. This allows one or more of iron, chromium, molybdenum and tungsten to be taken inside the TiNi phase to provide further excellent properties.

It is preferred that before the formation of the Ti—Ni system alloy phase in the surface portion, the hydrogen storage alloy powder is heated for 2 to 12 hours at 1200 to 1400° C. in an atmosphere of an inert gas or a hydrogen gas, or under vacuum, which is followed by either process (A) or (X), or the mechanochemical reaction. The pretreatment facilitates to obtain a single-phase alloy having body-centered cubic crystal structure and a higher discharge capacity.

The particle size of the active material having the Ti—Ni system alloy phase on the surface layer is preferably 40 $\mu$m or below and more preferably 30 $\mu$m or below. When the size is larger than 40 $\mu$m, the active material is pulverized while hydrogen is being absorbed or desorbed, and hence the percentage of the surface having the nickel diffused layer decreases to deteriorate the electrode characteristics.

In case to obtain a iron-containing alloy, the use of a Fe—Mo alloy as a starting material can lower its melting temperature, making it easier to obtain a homogeneous alloy.

The present invention will be further detailed based on the embodiments as follows.

EXAMPLES (1) Preparation of a Hydrogen Storage Alloys

Hydrogen storage alloys were prepared by the arc melting process using commercially available starting materials. After placed under vacuum for one hour at 200° C., the obtained alloys were subjected to a cycle of absorbing hydrogen under a hydrogen gas pressure of 50 atmospheres and then desorbing the hydrogen for five hours under vacuum. The cycle was repeated three times to pulverize the alloys by hydrogenolysis. Further mechanical pulverization and classification were conducted to obtain a desired particle size. The alloy powders mentioned hereinafter have a particle size of 40 $\mu$m or below unless otherwise specified.

(2) Characteristics of the Hydrogen Storage Alloys

The hydrogen storage properties of the above-mentioned alloy powders were measured using a Sievert's device. The measurements were conducted at 25° C. to find the hydrogen equilibrium pressure at the plateau (plateau pressure) during absorbing hydrogen.

(3) Formation of the Ti—Ni System Alloy Phase

The Ti—Ni system alloy phase was formed in the surface portion of the alloy particles in the following manner to prepare particulate active materials. In the following, 10 wt % of nickel to the hydrogen storage alloy was diffused.

Method 1

After the surface of the alloy powder particles was cleaned with 2% fluoric acid, the alloy powder was placed into an electroless plating (nonelectrode plating) bath, and left for 30 minutes while being stirred at 50° C. In the process, a commercially available nickel electroless plating solution (SUMER S-780 by JAPAN KANIGEN Co., Ltd.) was used. Then, a predetermined heat treatment was conducted.

Method 2

The alloy powder was mixed with nickel powder having a mean particle size of 0.03 μm to apply the nickel powder onto the surface of the alloy powder particles. Later, a predetermined heat treatment was conducted.

Method 3

Mechanical alloying was conducted; the alloy powder was mixed for 3 hours with nickel powder having a mean particle size of 0.03 μm using a planetary ball mill (P-5 by FRITSCH JAPAN Co., Ltd.) to conduct a mechanochemical reaction.

Method 4

The alloy powder was mixed with a nickel carbonyl-containing gas. The gas was thermal-decomposed at 200° C. to apply nickel onto the surface of the powder particles. After this, a heat treatment was conducted for six hours at 600° C. under vacuum.

(4) Preparation and Evaluation of the Hydrogen Storage Alloy Electrode 0.1 g of the obtained particulate active material and 0.4 g of copper powder were mixed and pressed to form a pellet to provide a hydrogen storage alloy electrode. Nickel mesh was pressed on the electrode and a nickel ribbon was welded thereto so as to provide a current collector. A charging and discharging was conducted using the electrode as the negative electrode, a nickel hydroxide electrode as the counter electrode having an excessive electric capacity and an aqueous potassium hydroxide solution as the electrolyte solution having a specific gravity of 1.30 in an open cell wherein the capacity was regulated by the negative electrode and the electrolyte affluent.

The charging and discharging cycle was repeated under the conditions that charging was performed at a current of 100 mA per gram of the hydrogen storage alloy for 12 hours during the first cycle and for 6 hours during and after the second cycle, and discharging was performed until the terminal voltage became 1.0 Volt at a current of 50 mA per gram of the alloy. Capacity degradation was calculated by the following formula:

Capacity degradation (%)={(the decrease in discharge capacity after 50 cycles)/(a maximum discharge capacity)}×100

(5) Preparation of a Sealed Battery

The above-mentioned particulate active material was mixed with a dilute aqueous solution of carboxymethyl cellulose (CMC) to form a paste, which was filled into a foamed nickel sheet having a porosity of 95% and a thickness of 0.8 mm. The nickel sheet-alloy paste structure was dried at 120° C., pressed by a roller, and then coated with fluororesin powder to provide a hydrogen storage alloy electrode.

The electrode was formed to have a width of 3.9 cm, a length of 10.5 cm and a thickness of 0.40 mm, and combined with a positive electrode and a separator. The three-layered structure was rolled up together and placed into a size AA battery vessel. The positive and negative electrodes were provided with lead plates that were welded to positive and negative electrode terminals, respectively. A standard foamed nickel electrode of 3.9 cm in width, 70 cm in length and 0.075 cm in thickness was used as the positive electrode. A non-woven fabric made of polypropylene having hydrophilicity was used as the separator. A solution of 30 g of lithium hydroxide dissolved in one liter of an aqueous potassium hydroxide solution having a specific gravity of 1.30 was used as the electrolyte solution. The battery vessel was sealed, resulting in a sealed type battery. The capacity of the battery is regulated by the positive electrode, with a nominal capacity of 1.3 Ah.

(6) High-temperature Storage Test

After having been charged for 15 hours at 25° C. at a current of 0.1 C. and then discharged at 0.2 C. in the first cycle, the sealed type battery was left for two days at 50° C. The charging and discharging cycle was repeated five times under the same conditions as the first charging and discharging cycle to check the capacity. The battery whose capacity had been checked was preserved for three months at 80° C. Again, the same charging and discharging cycle was repeated to find the discharge capacity after the storage that was compared with the discharge capacity before the storage. To be more specific, the capacity preservation of the sealed battery after the high-temperature storage was calculated by the following formula:

Capacity preservation (%)={(discharge capacity after the storage)/(discharge capacity before the storage)}×100

Embodiment 1

The present embodiment investigates the composition of the hydrogen storage alloy.

The alloy powders having the compositions listed in Table 1 were prepared as described in (1) above. The samples (1-1) to (1-31) belong to the embodiment, whereas the other samples (1-32) to (1-37) to comparative examples. Lanthanum was used as element L, which is a component of the alloy unless other elements are shown in the table. Mm represents a misch metal. The plateau pressures of these alloy powders were measured as described in (2) above. The results are shown in Table 1.

For each alloy powder, a Ti—Ni system alloy phase was formed in the surface portion of the alloy powder particles based on Method 1 described in (3) above to provide particulate active material. The heat treatment after nickel plating was continued for six hours at 625° C. under vacuum. The electrode characteristics of the obtained particulate active materials were measured as described in (4) above. The maximum discharge capacity of each electrode and capacity degradation after 50 charging and discharging cycles are shown in Table 1.

TABLE 1

| Sample No. | Composition | | | | | | Maximum discharge capacity (mAh/g) | Capacity degradation (%) | Plateau pressure (MPa) |
| --- | --- | --- | --- | --- | --- | --- | --- | --- | --- |
| | Ti | Mo | Nb | Cr | L (La) | $M^2$ | | | |
| 1-1 | 0.68 | 0.15 | | 0.15 | 0.02 | | 506 | 7 | 0.009 |
| 1-2 | 0.68 | | 0.15 | 0.15 | 0.02 | | 509 | 8 | 0.007 |
| 1-3 | 0.68 | 0.1 | 0.05 | 0.15 | 0.02 | | 508 | 7 | 0.008 |
| 1-4 | 0.5 | 0.1 | | 0.39 | 0.01 | | 543 | 6 | 0.091 |

TABLE 1-continued

| Sample No. | Composition Ti | Mo | Nb | Cr | L (La) | M² | | Maximum discharge capacity (mAh/g) | Capacity degradation (%) | Plateau pressure (MPa) |
|---|---|---|---|---|---|---|---|---|---|---|
| 1-5 | 0.5 | | 0.1 | 0.39 | 0.01 | | | 548 | 8 | 0.086 |
| 1-6 | 0.5 | 0.05 | 0.05 | 0.39 | 0.01 | | | 547 | 7 | 0.089 |
| 1-7 | 0.5 | 0.1 | | 0.4 | | | | 536 | 6 | 0.09 |
| 1-8 | 0.4 | 0.1 | 0.1 | 0.37 | 0.03 | | | 531 | 7 | 0.093 |
| 1-9 | 0.3 | 0.07 | | 0.6 | 0.03 | | | 482 | 5 | 0.106 |
| 1-10 | 0.2 | 0.3 | | 0.48 | 0.02 | | | 496 | 4 | 0.107 |
| 1-11 | 0.4 | 0.05 | | 0.3 | | Co | 0.25 | 512 | 6 | 0.112 |
| 1-12 | 0.5 | 0.07 | | 0.35 | 0.02 | Mn | 0.06 | 549 | 8 | 0.085 |
| 1-13 | 0.5 | 0.07 | | 0.35 | 0.02 | Fe | 0.06 | 540 | 4 | 0.095 |
| 1-14 | 0.5 | 0.07 | | 0.35 | 0.02 | Co | 0.06 | 546 | 5 | 0.094 |
| 1-15 | 0.5 | 0.07 | | 0.35 | 0.02 | Cu | 0.06 | 530 | 5 | 0.094 |
| 1-16 | 0.5 | 0.07 | | 0.35 | 0.02 | V | 0.06 | 543 | 8 | 0.09 |
| 1-17 | 0.5 | 0.07 | | 0.35 | 0.02 | Zn | 0.06 | 528 | 10 | 0.089 |
| 1-18 | 0.5 | 0.07 | | 0.35 | 0.02 | Zr | 0.06 | 533 | 4 | 0.088 |
| 1-19 | 0.5 | 0.07 | | 0.35 | 0.02 | Ag | 0.06 | 541 | 5 | 0.092 |
| 1-20 | 0.5 | 0.07 | | 0.35 | 0.02 | Hf | 0.06 | 539 | 6 | 0.086 |
| 1-21 | 0.5 | 0.07 | | 0.35 | 0.02 | Ta | 0.06 | 543 | 7 | 0.085 |
| 1-22 | 0.5 | 0.07 | | 0.35 | 0.02 | W | 0.06 | 526 | 6 | 0.088 |
| 1-23 | 0.5 | 0.07 | | 0.35 | 0.02 | Al | 0.06 | 518 | 10 | 0.093 |
| 1-24 | 0.5 | 0.07 | | 0.35 | 0.02 | Si | 0.06 | 519 | 6 | 0.094 |
| 1-25 | 0.5 | 0.1 | | 0.35 | 0.02 | N | 0.03 | 506 | 7 | 0.091 |
| 1-26 | 0.5 | 0.1 | | 0.35 | 0.02 | C | 0.03 | 502 | 7 | 0.092 |
| 1-27 | 0.5 | 0.1 | | 0.35 | 0.02 | P | 0.03 | 508 | 8 | 0.093 |
| 1-28 | 0.5 | 0.1 | | 0.35 | 0.02 | B | 0.03 | 510 | 6 | 0.093 |
| 1-29 | 0.5 | 0.1 | | 0.38 | Ce 0.02 | | | 546 | 6 | 0.091 |
| 1-30 | 0.5 | 0.1 | | 0.38 | Mm 0.02 | | | 541 | 7 | 0.092 |
| 1-31 | 0.5 | 0.1 | | 0.38 | Y 0.02 | | | 545 | 6 | 0.09 |
| 1-32 | 0.1 | 0.1 | 0.1 | 0.68 | 0.02 | | | 182 | 3 | 0.156 |
| 1-33 | 0.48 | | | 0.5 | 0.02 | | | 420 | 18 | 0.098 |
| 1-34 | 0.8 | 0.05 | | 0.13 | 0.02 | | | 331 | 34 | 0.008 |
| 1-35 | 0.35 | | 0.63 | | 0.02 | | | 491 | 58 | 0.013 |
| 1-36 | 0.1 | 0.1 | | 0.8 | | | | 123 | 4 | 0.233 |
| 1-37 | 0.3 | 0.5 | | 0.15 | 0.05 | | | 423 | 5 | 0.185 |

Table 1 reveals that the alloys of comparative examples have smaller maximum discharge capacities and larger capacity degradations. The alloys of the embodiment, on the other hand, exhibit excellent properties including discharge capacities larger than 450 mA-hr/g and capacity degradation less than 10%.

Embodiment 2

The present embodiment investigates the effect of adding iron and silicon to an alloy as its components on the high-temperature storage test of the battery incorporating the alloy.

The alloy powders having the compositions listed in Table 2 were prepared as described (1) above.

For each alloy powder, a Ti—Ni system alloy phase was formed in the surface portion of the alloy powder particles in the same manner as described in embodiment 1 to obtain the particulate active material. Sealed batteries were prepared as described in (5) above using the obtained particulate active materials, and the capacity preservations after high-temperature storage were found as described in (6) above. The results are shown in Table 2.

TABLE 2

| Sample No. | Composition | | | | | | Capacity preservation (%) |
|---|---|---|---|---|---|---|---|
| | Ti | Mo | Cr | La | Fe | Si | |
| 2-1 | 0.45 | 0.1 | 0.43 | 0.02 | 0 | 0 | 83.6 |
| 2-2 | 0.45 | 0.1 | 0.33 | 0.02 | 0.1 | 0 | 85.4 |
| 2-3 | 0.45 | 0.1 | 0.33 | 0.02 | 0 | 0.1 | 86.9 |
| 2-4 | 0.45 | 0.1 | 0.33 | 0.02 | 0.05 | 0.05 | 93.5 |
| 2-5 | 0.45 | 0.1 | 0.33 | 0.02 | 0.02 | 0.08 | 91.2 |
| 2-6 | 0.45 | 0.1 | 0.33 | 0.02 | 0.08 | 0.02 | 95.1 |

Table 2 shows that batteries employing Samples (2-4) to (2-6) made from the alloys containing both iron and silicon in their compositions have high capacity preservations, which indicates excellent storage characteristics under high temperatures. The capacity preservations grow with increasing iron content, but reduces without silicon content.

When the amount of iron and silicon exceeded 0.2, the second phase of TiFe system begun to segregate, and when the amount exceeded 0.3, the capacity decreased remarkably. These results indicate that adding iron and silicon in trace amounts to an alloy improves the storage characteristics under high temperatures of the battery having the alloy.

Embodiment 3

The present embodiment investigates the formation of the Ti—Ni system alloy phase in the surface portion.

The Ti—Ni system alloy phase was formed in the surface portion of the alloy powder particles whose composition is represented by $Ti_{0.5}Mo_{0.05}Nb_{0.05}Cr_{0.39}La_{0.01}$ prepared as described (1) above, so as to provide particulate active material.

The Ti—Ni system alloy phase was formed as follows.

Samples (3-1) to (3-5): a Ti—Ni system alloy phase was formed based on Method 1 described in (3) above. While Sample (3-1) was not subjected to a heat treatment after nickel plating, Samples (3-2) to (3-5) were heat-treated for the respective times at the respective temperatures as indicated in Table 3 under vacuum.

Samples (3-6) and (3-7): a Ti—Ni system alloy phase was formed based on Method 2 described in (3). While Sample, (3-6) was not subjected to a heat treatment after the alloy particle surface was applied with nickel powder, Sample (3-7) was heat-treated for six hours at 600° C. under vacuum.

Sample (3-8): a Ti—Ni system alloy phase was formed based on Method 3 described in (3).

Samples (3-9) to (3-14): a Ti—Ni system alloy phase was formed based on Method 4 described in (3). For sample (3-9) a gas containing 60% by volume of nickel carbonyl and 40% by volume of carbon monoxide was thermal-decomposed. For samples (3-10) to (3-14), gases containing 50% by volume of nickel carbonyl, 45% by volume of carbon monoxide and 5% by volume of iron carbonyl, chromium carbonyl, molybdenum carbonyl or tungsten carbonyl, respectively, were thermal-decomposed under the same conditions. For Sample (3-14), a gas containing 60% by volume of molybdenum carbonyl and 40% by volume of carbon monoxide was thermal-decomposed first to apply the alloy particle surface with molybdenum, and then a gas containing 60% by volume of nickel carbonyl and 40% by volume of carbon monoxide was thermal-decomposed. Each metallic element was applied onto the alloy by 10 wt % to nickel.

The electrode characteristics of the obtained particulate active materials were measured as described in (4) above.

The maximum discharge capacity of each electrode and capacity degradation after 50 charging and discharging cycles are shown in Table 3.

TABLE 3

| Sample No. | Nickel application | Maximum discharge capacity (mAh/g) | Capacity degradation (%) |
|---|---|---|---|
| 3-1 | Ni electroless plating | 0 | — |
| 3-2 | Ni electroless plating 400° C. × 6 h | 132 | 52 |
| 3-3 | Ni electroless plating 600° C. × 6 h | 538 | 5 |
| 3-4 | Ni electroless plating 900° C. × 0.5 h | 503 | 11 |
| 3-5 | Ni electroless plating 1100° C. × 0.5 h | 235 | 12 |
| 3-6 | Ni powder mixing | 9 | — |
| 3-7 | Ni powder mixing 600° C. × 6 h | 498 | 8 |
| 3-8 | Ni powder mixing 3 hours in ball mill | 476 | 11 |
| 3-9 | Vapor-phase process with Ni only 600° C. × 6 h | 543 | 5 |
| 3-10 | Vapor-phase process with Ni + Fe (10% to Ni) 600° C. × 6 h | 539 | 4 |
| 3-11 | Vapor-phase process with Ni + Cr (10% to Ni) 600° C. × 6 h | 535 | 3 |
| 3-12 | Vapor-phase process with Ni + Mo (10% to Ni) 600° C. × 6 h | 538 | 4 |
| 3-13 | Vapor-phase process with Ni + W (10% to Ni) 600° C. × 6 h | 530 | 4 |
| 3-14 | Vapor-phase process with Mo (10% to Ni) and later with Ni 600° C. × 6 h | 543 | 4 |

Table 3 reveals that Samples (3-1) and (3-6) having only nickel put on the surface of alloy particles failed to exhibit a high discharge capacity because of the absence of the Ti—Ni system alloy phase in the surface portion of the alloy particles. On the other hand, in Samples (3-2) to (3-5) and (3-7) heat-treated and Sample (3-8) subjected to the mechanical process, a Ti—Ni system alloy phase was formed in the surface portion of the alloy particles. This results in high discharge capacity and the low capacity degradation.

A comparison of Sample (3-3) and Sample (3-7) indicates that Method 1 is superior to Method 2. This result demonstrates that plating can apply the surface of the alloy particles with nickel better than the other methods. Samples (3-9) and (3-14), which employ thermal decomposition of nickel carbonyl for the application of nickel, show excellent properties. Above all, Samples applied with either of iron, chromium, molybdenum or tungsten together with nickel have further improved capacity degradation.

A comparison of Samples (3-2) to (3-5) shows that the preferable temperatures of the heat treatment performed after nickel plating were 500 to 1000° C. Sample (3-2) heat-treated at lower than 500° C. and Sample (3-5) heat-treated at higher than 1000° C. have poor discharge capacities. This is because nickel diffusion is not enough at temperatures lower than 500° C., and proceeds too much at temperatures higher than 1000° C. even the heating time is shortened, which undesirably increases the proportion of $Ti_2Ni$ in the Ti—Ni system alloy phase. Samples heat-treated were subjected to X-ray diffraction to find that when main peak ratio of TiNi is 70% or lower, which means that the amount of TiNi is 70% or lower by volume of the Ti—Ni system alloy phase, discharge capacity decreases and capacity degradation increases.

The cross section of the particulate active material of each of Samples (3-3), (3-4) and (3-7) to (3-14) was observed by SEM and EPMA. It was found that nickel concentration gradually decreases from the surface towards inside, and that 90% of the entire amount of nickel exists in a depth up to 2 $\mu$m from the particle surface.

Embodiment 4

The present embodiment investigates the effects of the heat treatment performed before the formation of the Ti—Ni system alloy phase.

Alloy powder having a composition represented by $Ti_{0.5}Mo_{0.05}Nb_{0.05}Cr_{0.39}La_{0.01}$ was prepared as described in (1) above, and Samples (4-2) to (4-4) were heat-treated for two hours at the respective temperatures shown in Table 4. The other conditions to obtain particulate active materials and evaluation were the same as in Sample (3-3). Evaluation results are shown in Table 4.

TABLE 4

| Sample No. | Heat treatment conditions | Maximum discharge capacity (mAh/g) | Capacity degradation (%) |
| --- | --- | --- | --- |
| 4-1 | None | 538 | 5 |
| 4-2 | 1000° C. × 2h | 542 | 6 |
| 4-3 | 1300° C. × 2h | 549 | 6 |
| 4-4 | 1500° C. × 2h | (Partial melting) | — |

Table 4 reveals that Samples (4-2) and (4-3) heat-treated before nickel diffusion have higher discharge capacities than Sample (4-1) not heat-treated before nickel diffusion. Sample (4-3) heat-treated at 1300° C. shows the highest discharge capacity of all. At 1500° C., the alloy partially melted.

Samples (4-1) to (4-4) were subjected to X-ray diffraction to find that Sample (4-2), which was heat-treated at a low temperature, and Sample (4-1) had the peak of a segregated phase, and that Sample (4-3) had a homogenized system, which seems to have caused an increase in hydrogen storing capability and in discharge capacity.

Therefore, the desirable heat treatment temperatures to obtain high discharge capacity ranges from 1200 to 1400° C., and more preferably around 1300° C.

Embodiment 5

The present embodiment investigates alloy particle size in preparing electrodes.

Alloy powder having a composition represented by $Ti_{0.5}Mo_{0.05}Nb_{0.05}Cr_{0.39}La_{0.01}$ was prepared as described in (1) above. Particulate active material in the present embodiment was obtained and evaluated in the same conditions as in Sample (3-3) except that the alloy powder was classified into 75 $\mu$m, 40 $\mu$m and 15 $\mu$m mesh sizes. Examination results are shown in Table 5.

TABLE 5

| Sample No. | Alloy particle size | Maximum discharge capacity (mAh/g) | Capacity degradation (%) |
| --- | --- | --- | --- |
| 5-1 | 40 $\mu$m or below | 538 | 5 |
| 5-2 | 75 $\mu$m or below | 452 | 13 |
| 5-3 | 15 $\mu$m or below | 511 | 8 |

Table 5 reveals that Sample (5-2), which employs alloy powder having a particle size larger than 40 $\mu$m, shows a comparatively low discharge capacity and comparatively high capacity degradation. On the other hand, Samples(5-1) and (5-3), which employ alloy powders having a particle size of 40 $\mu$m or below, show excellent characteristics. It is considered that particles larger than 40 $\mu$m not only reduces nickel-applied area but also generates area not having nickel since the large particles are pulverized during a charging and discharging. Alloy powders having a particle size of 40 $\mu$m or below are considered to have similar properties. A particle size of 15 $\mu$m or below results in an increase in specific surface and a decrease in discharge capacity due to oxidation, which makes the nickel diffusion layer thinner to deteriorate corrosion resistance. These are considered to be the causes of Sample (5-3) having comparatively poor characteristics.

The present invention achieves a hydrogen storage alloy electrode having higher discharge capacity and more excellent cycle characteristics than conventional electrodes. Consequently, employing the electrode realizes a nickel hydrogen storage battery having higher capacity than conventional batteries.

What is claimed is:

1. A hydrogen storage alloy electrode made from particulate active material comprising a hydrogen storage alloy of body-centered cubic crystal structure or body-centered tetragonal crystal structure, said hydrogen storage alloy being represented by the general formula $Ti_aM^1_bCr_cM^2_dL_e$, wherein $M^1$ is at least one element selected from the group consisting of Nb and Mo; $M^2$ is at least one element selected from the group consisting of Mn, Fe, Co, Cu, V, Zn, Zr, Ag, Hf, Ta, W, Al, Si, C, N, P and B; L is at least one element selected from the group consisting of rare-earth elements and Y; $0.2 \leq a \leq 0.7$; $0.01 \leq b \leq 0.4$; $0.1 \leq c \leq 0.7$; $0 \leq d \leq 0.3$; $0 \leq e \leq 0.03$; and a+b+c+d+e=1.0, and said particulate active material having a Ti—Ni system alloy phase in the surface portion thereof.

2. The hydrogen storage alloy electrode in accordance with claim 1, wherein said general formula satisfies $0.4 \leq a \leq 0.64$, $0.05 \leq b \leq 0.2$, $0.3 \leq c \leq 0.4$, $0 \leq d \leq 0.2$, $0 \leq e \leq 0.03$ and a+b+c+d+e=1.0.

3. The hydrogen storage alloy electrode in accordance with claim 2, said hydrogen storage alloy being represented by the general formula $Ti_aM^1_bCr_cM^2_dL_eFe_fSi_g$, wherein $M_1$ is neither Fe nor Si, $0.003 \leq f < 0.2$, $0 < g \leq 0.1$, $d+f+g \leq 0.2$ and a+b+c+d+e+f+g=1.0.

4. The hydrogen storage alloy electrode in accordance with claim 1, wherein 70% by volume or more of said Ti—Ni system alloy phase has the body-centered cubic crystal structure of TiNi.

5. The hydrogen storage alloy electrode in accordance with claim 1, wherein nickel concentration of said particulate active material gradually decreases from the surface towards inside thereof.

6. The hydrogen storage alloy electrode in accordance with claim 1, wherein said particulate active material has a particle size of 40 $\mu$m or below.

7. A method for manufacturing a hydrogen storage alloy electrode comprising the steps of:

(A) plating nickel or applying nickel powder onto the surface of a hydrogen storage alloy powder, or mixing a hydrogen storage alloy powder with a nickel carbonyl-containing gas and thermally decomposing the gas to apply nickel onto the surface of the alloy powder, and (B) heating said alloy powder at 500 to 1000° C. in an atmosphere of an inert gas or a hydrogen gas, or under vacuum, said hydrogen storage alloy of starting material having body-centered cubic crystal structure or body-centered tetragonal crystal structure, and being represented by the general formula $Ti_aM^1{}_bCr_cM^2{}_dL_e$, wherein $M^1$ is at least one element selected from the group consisting of Nb and Mo; $M^2$ is at least one element selected from the group consisting of Mn, Fe, Co, Cu. V, Zn, Zr, Ag, Hf, Ta, W, Al, Si, C, N, P and B; L is at least one element selected from the group consisting of rare-earth elements and Y; $0.2 \leq a \leq 0.7$; $0.01 \leq b \leq 0.4$; $0.1 \leq c \leq 0.7$; $0 \leq d \leq 0.3$; $0 \leq e \leq 0.03$; and $a+b+c+d+e=1.0$.

8. The method for manufacturing a hydrogen storage alloy electrode in accordance with claim 7, wherein said nickel carbonyl-containing gas contains 20 to 90% by volume of nickel carbonyl and 10 to 80% by volume of carbon monoxide.

9. The method for manufacturing a hydrogen storage alloy electrode in accordance with claim 7, wherein said nickel carbonyl-containing gas contains 20 to 85% by volume of nickel carbonyl, 10 to 75% by volume of carbon monoxide, and 5 to 50% by volume of at least one selected from the group consisting of iron carbonyl, chromium carbonyl, molybdenum carbonyl and tungsten carbonyl.

10. The method for manufacturing a hydrogen storage alloy electrode in accordance with claim 7, prior to the step (A), further comprising the step of:

(X) mixing said hydrogen storage alloy powder with a gas containing 20 to 90% by volume of at least one selected from the group consisting of iron carbonyl, chromium carbonyl, molybdenum carbonyl and tungsten carbonyl, and 10 to 80% by volume of carbon monoxide, and thermally decomposing the gas to apply at least one selected from the group consisting of iron, chromium, molybdenum and tungsten onto the surface of the alloy powder.

11. A method for manufacturing a hydrogen storage alloy electrode comprising the step of:

conducting mechanochemical reaction between hydrogen storage alloy powder and nickel, said hydrogen storage alloy having body-centered cubic crystal structure or body-centered tetragonal crystal structure, and being represented by the general formula $Ti_aM^1{}_bCr_cM^2{}_dL_e$, wherein $M^1$ is at least one element selected from the group consisting of Nb and Mo; $M^2$ is at least one element selected from the group consisting of Mn, Fe, Co, Cu, V, Zn, Zr, Ag, Hf, Ta, W, Al, Si, C, N, P and B; L is at least one element selected from the group consisting of rare-earth elements and Y; $0.2 \leq a \leq 0.7$; $0.01 \leq b \leq 0.4$; $0.1 \leq c \leq 0.7$; $0 \leq d \leq 0.3$; $0 \leq e \leq 0.03$; and $a+b+c+d+e=1.0$.

12. The method for manufacturing a hydrogen storage alloy electrode in accordance with claim 7, prior to the step (A), further comprising the step of:

heating said hydrogen storage alloy powder at 1200 to 1400° C. in an atmosphere of an inert gas or a hydrogen gas, or under vacuum.

13. The method for manufacturing a hydrogen storage alloy electrode in accordance with claim 10, prior to the step (X), further comprising the step of:

heating said hydrogen storage alloy powder at 1200 to 1400° C. in an atmosphere of an inert gas or a hydrogen gas, or under vacuum.

14. The method for manufacturing a hydrogen storage alloy electrode in accordance with claim 11, prior to the step of said mechanochemical reaction, further comprising the step of:

heating said hydrogen storage alloy powder at 1200 to 1400° C. in an atmosphere of an inert gas or a hydrogen gas, or under vacuum.

* * * * *